United States Patent [19]
Sugawara et al.

[11] Patent Number: 5,837,026
[45] Date of Patent: Nov. 17, 1998

[54] METHOD FOR PRODUCING A GLASS PANEL FOR A CATHODE RAY TUBE

[75] Inventors: Tsunehiko Sugawara; Toshikazu Ikezawa; Naoya Shimizu; Hiroshi Yamasaki, all of Funabashi, Japan

[73] Assignee: Asahi Glass Company Ltd., Tokyo, Japan

[21] Appl. No.: 986,871

[22] Filed: Dec. 8, 1997

[30] Foreign Application Priority Data

Dec. 26, 1996 [JP] Japan .................................. 8-348613

[51] Int. Cl.$^6$ ........................................................ C03B 9/30
[52] U.S. Cl. ................ 65/66; 65/63; 65/69; 65/83; 65/85; 65/104; 65/114; 65/115; 65/117
[58] Field of Search .................. 65/63, 60, 69, 65/83, 85, 104, 114, 115, 117

[56] References Cited

U.S. PATENT DOCUMENTS

| | | |
|---|---|---|
| 2,991,591 | 7/1961 | Gabor et al. . |
| 3,567,415 | 3/1971 | Carpenter .................................. 65/69 |
| 4,333,756 | 6/1982 | Seeman . |
| 4,566,893 | 1/1986 | Hopkins et al. . |
| 4,871,385 | 10/1989 | LeCourt et al. ........................... 65/114 |
| 5,145,437 | 9/1992 | Ondra et al. ............................... 65/115 |
| 5,445,285 | 8/1995 | Sugawara et al. . |
| 5,536,995 | 7/1996 | Sugawara et al. . |
| 5,547,409 | 8/1996 | Nakamura et al. ........................ 65/115 |

FOREIGN PATENT DOCUMENTS

| | | |
|---|---|---|
| 1 582 023 | 12/1980 | United Kingdom . |
| 2 300 906 | 11/1996 | United Kingdom . |

*Primary Examiner*—Peter Chin
*Assistant Examiner*—Michael P. Colaianni
*Attorney, Agent, or Firm*—Oblon, Spivak, McClelland, Maier & Neustadt, P.C.

[57] ABSTRACT

Air is blowed before an annealing step to corner portions in an inner face portion of a glass panel which has been press-formed in a mold to cool that portions to be stronger than the other portion whereby a temperature difference between the corner portions and the other portion is reduced.

6 Claims, 5 Drawing Sheets

METHOD FOR PRODUCING A GLASS PANEL FOR A CATHODE RAY TUBE

The present invention relates to a method for producing a glass panel for a cathode ray tube used mainly for receiving signals of TV broadcasting or the like. In particular, the present invention relates to a method for producing the glass panel by a physically strengthening method.

The formation of a compressive stress layer in a glass panel surface by a physically strengthening method can improve the strength of the surface and is effective for preventing thermal breakage during the manufacture of a cathode ray tube and delayed breakage after the completion of manufacturing of the cathode ray tube.

When the physically strengthening method is conducted to the glass panel in a stage that the temperature of the inside of the glass panel is in a temperature range capable of rearranging molecules constituting glass, a temporary stress is produced in the surface of the cooled glass panel so that the temperature of the surface portion is brought into a temperature range incapable of rearranging the molecules whereby a nonequilibrium state of stress is resulted between the inside and the surface of the glass panel. Then, when the glass panel is cooled to room temperature in such nonequilibrium state, a permanent stress is produced.

The glass panel is usually formed and strengthened as follows. In a first stage, a glass gob at about 1,000° C. is put into a bottom mold, and the glass gob is pressed with a plunger. After the plunger has been raised, cooled air is blowed to an inner face of the formed glass panel to such a temperature range that an outer face of the solidified glass panel does not stick to the bottom mold without a large visco-elastic deformation. In this process, there takes place a large temperature difference between the inside and the surface of the glass panel, and also there takes place a large temperature distribution in the glass panel plane due to the wall thickness distribution and the three-dimensional structure of the glass panel. Namely, since the glass panel has a rectangular panel face portion in which the wall thickness is gradually increased toward the peripheral portion and has a box-like shape provided with a skirt portion in its circumferential portion, the heat-transmitting surface area in the circumferential portion is small in comparison with a distribution of the mass, and a quantity of heat to be taken away from the circumferential portion is relatively small. Further, since the cooling air is blowed through a nozzle to cool the central portion of the inner face of the box-like glass panel in a conventional method for producing the glass panel, cooling effect for the central portion of the inner face is naturally higher than that for the circumferential portion. In particular, the cooling effect to the corner portions in the inner face of the rectangular panel face portion is not so sufficient that these portions indicate a high temperature in comparison with the other portion, and a temperature difference between the inside (or core) and the surface in the direction of the wall thickness of the corner portions is relatively small. In this stage, however, the temporary stress to be produced in the glass panel is not so large because the temperature of the inside as well as the surface is relatively high.

In a second stage, the formed glass panel is taken out from the mold, and it is cooled to an annealing point or lower while a large temperature difference is kept between the inside and the surface as a whole, so that a large temporary stress can be produced. However, when such cooling operation is continued in this state, a temporary stress accumulated in the glass panel becomes excessive whereby there takes place self-explosion during the cooling process. Or the compaction is far beyond the permissible range to be able to ensure its utility.

For this, in a third stage, the temperature of the glass panel is maintained in a temperature region capable of rearranging molecules constituting glass for about 30–40 min to reduce a temperature difference between the inside and the surface of the glass panel, and an annealing operation is conducted to relax the temporary stress and the compaction to thereby assure utility. Further, the glass panel is cooled to room temperature through a low temperature region in which it is impossible to rearrange the molecules constituting glass while the temporary stress controlled to be in an appropriate range in the third stage is maintained whereby a permanent stress is retained in the glass panel. Thus, a compressive stress layer can effectively be formed in the surface of the glass panel as described above. On the other hand, there has been known that the glass panel having the above-mentioned heat history has an unnecessary compaction. Such compaction is produced by the rearrangement of the molecules constituting glass in order to obtain a stable structure in terms of thermodynamics when the glass panel suffers a heat treatment again. The compaction is defined as a ratio of a change in length of a specified portion in the useful screen area between, after and before thermal processings. Namely, a value obtained by dividing a length of the specified portion of the useful screen area after thermal processing by the initial length of the specified portion before thermal processing.

In an assembling process for a color cathode ray tube, a fluorescent film as a screen is provided at an inner face portion of the glass panel and an aluminum film is formed behind the screen. Then, a shadow mask is mounted onto the glass panel. Then, a heat treatment is conducted at about 440° C. for about 35 min in order to seal the glass panel to a glass funnel. In this case, an unnecessary compaction is produced in an effective plane in the screen of the glass panel. On the other hand, it is required to have a correct positional relation between openings of the shadow mask to picture elements of fluorescent film to be opposed thereto in order to obtain color purity. However, the compaction results an error in the relative positional relation between the openings of the shadow mask and the picture elements. A quantity of the error is defined as a magnitude of mislanding. The relation between the magnitude of mislanding $U(r)$ at an arbitrary position in a distance r from the center of the effective plane of the screen and the compaction C is expressed by Formula 2:

$$U(r) = \int_0^r C(r')dr' \qquad \text{Formula 2}$$

Namely, the magnitude of mislanding can be expressed as a value accumulated from the center of the screen, and accordingly, the magnitude of mislanding at the end of the effective plane near the skirt portion has a highest value. Accordingly, minimization of the compaction at a specified position does not always mean the minimization of the magnitude of mislanding. Namely, it is important to reduce a distribution of the compaction in the effective plane so that the magnitude of mislanding at the edge portion of the effective plane is within a permissible range.

In the conventional method, when the above-mentioned glass panel is formed and strengthened, a temperature difference is produced in a sectional direction or a wall thickness direction in at least the first stage and the second stage, and at the same time, an unnecessary temperature distribution is produced in an in-plane direction in the panel face because of the glass panel having a box-like three-dimensional structure and an uneven wall thickness as described above. In particular, in the regions near the corner portions and at the edge portion of the effective plane of the panel face portion, which are adjacent to the skirt portion, heat influx results from these regions and the skirt portion. Accordingly, these regions have naturally a small cooling rate unlike a cooling rate at the central portion of the panel face as a simple radiation plane. Accordingly, in an initial step or a final step in the second stage, there takes place a large temperature difference in the surface area between the center portion of the panel face and the edge portion of the effective plane of the panel face. In particular, such tendency is remarkable between the center portion and the corner portions of the panel face, and such tendency appears in the inner face portion rather than the outer face portion which is in contact with the mold for a relatively long time.

As the result of producing a large temperature distribution in the effective plane of the panel face in the strengthening step, a distribution of compressive stress value is produced in the glass surface and also, a distribution of compaction value is produced in the effective plane of the panel face, which increases the magnitude of mislanding. Further, since the cooling rate in the inner face near the edge portion of the effective plane of the panel face portion is low, a temperature difference in the cross-sectional direction in such region in the strengthening step naturally decreases whereby a compressive stress value produced in the surface is smaller than that in the central portion of the panel face.

In the third stage in the conventional method, an annealing operation is conducted to reduce the temperature difference between the inside and the surface of the panel glass and to release the temporary stress appropriately. Usually, when the glass panel is kept in a temperature region capable of rearranging molecules constituting glass for about 30–40 min, the temperature distribution can be minimized, however, an excessive amount of stress is released. Further, when the annealing is conducted in a short time, the temperature distribution can not be eliminated and an unnecessary stress in the panel face can not be eliminated.

When a necessary stress is to be remained, a large temperature distribution is unavoidable in the inner face portion of the glass panel after having been subjected to the first stage and the second stage. Namely, a large temperature distribution is produced in the central portion and the edge portion of the effective plane of the panel face and in the inner face of the skirt portion whereby an unnecessary tensile plane stress, which is different from the compressive strengthening stress, is produced in and near the end portion of the effective plane of the inner face of the panel face.

It is an object of the present invention to eliminate the before-mentioned disadvantage of the conventional technique in forming and strengthening the glass panel.

It is another object of the present invention to reduce the magnitude of mislanding which indicates the highest value at the edge portion of the effective plane of the panel face portion by minimizing a temperature difference in the plane of the panel face portion in the second stage for strengthening the glass panel. Further, the present invention is to increase a ratio of compressive stress value at a region of the end portion of the effective plane of the inner face of the panel face portion and the central portion of the inner face of the panel face by increasing the compressive stress value in or near the edge portion of the effective plane of the inner face portion.

It is another object of the present invention to shorten a time required for making a temperature distribution in the inner face of the panel face portion uniform by determining an initial annealing temperature to be low and then increasing the annealing temperature in the second stage as an annealing process whereby an unnecessary tensile plane stress produced in the inner face of the panel face portion is reduced while a predetermined compressive strengthening stress is maintained.

In accordance with a first aspect of the present invention, there is provided a method for producing a glass panel for a cathode ray tube which comprises a first stage of press-forming molten glass put in a mold and solidifying the formed glass until a glass surface temperature reaches lower than a sticking temperature, a second stage of cooling for strengthening the formed glass after it has been taken out from the mold, a third stage of relaxing a temporary stress in the formed glass which is produced during the second stage, and a fourth stage of cooling the formed glass to room temperature to produce a sufficient permanent stress, wherein corner portions in an inner face portion of the formed glass, which are in the highest temperature region in the second stage, are cooled stronger than the other portion to reduce a temperature difference to the central portion of the inner face portion which is in the lowest temperature region.

In a second aspect of the present invention, there is provided a method for producing a glass panel according to the first aspect wherein the formed glass is cooled so as to satisfy the following Formula 1:

$$0.4 \leq (T_{2fmax} - T_{2fmin})/(T_{2smax} - T_{2smin}) \leq 0.7 \qquad \text{Formula 1}$$

where $T_{2smax}$ is a temperature at the corner portions in the inner face portion, which are in the highest temperature region at an initial step of the second stage, $T_{2smin}$ is a temperature at the central portion of the inner face portion, which is in the lowest temperature region at an initial step of the second stage, $T_{2fmax}$ is a temperature at the corner portions in the inner face portion at a final step of the second stage, and $T_{2fmin}$ is a temperature at the central portion in the inner face portion at a final step of the second stage.

In a third aspect of the present invention, there is provided a method for producing a glass panel according to the second aspect wherein in the second stage, $T_{2smax}$, $T_{2smin}$, $T_{2fmax}$ and $T_{2fmin}$ are respectively in ranges of annealing point $\leq T_{2smax} \leq 650°$ C., $400°$ C. $\leq T_{2smin}$, $350°$ C. $\leq T_{2fmin}$, and $T_{2fmax} \leq$ strain point.

In a fourth aspect of the present invention, there is provided a method for producing a glass panel according to the second aspect wherein in the second stage, an average down-rate temperature $R_{2max}$ at the corner portions in the inner face portion and an average down-rate of temperature $R_{2min}$ at the central portion in the inner face portion are respectively in ranges of $45°$ C./min $\leq R_{2max} < 65°$ C./min and $30°$ C./min $\leq R_{2min} \leq 40°$ C./min.

In a fifth aspect of the present invention, there is provided a method for producing a glass panel according to the second aspect wherein temperature is controlled to satisfy the relations of $350°$ C. $\leq T_{3smin}$, $T_{3smax} <$ strain point, $T_{3smin} < T_{3smax}$, and $T_{3smin} < T_{3fmin} = T_{3fmax}$, where $T_{3smax}$ is a temperature at the corner portions in the inner face portion, which are in the highest temperature region at an initial step of the third stage, $T_{3smin}$ is a temperature at the central portion of the inner face portion, which is in the lowest temperature region at an initial step of the third stage, $T_{3fmax}$ is a temperature at the corner portions in the inner face portion at a final step of the third stage, and $T_{3fmin}$ is a temperature at the central portion in the inner face portion at a final step of the third stage.

When a physically strengthened glass panel is produced according to the present invention, it is important that a temperature difference produced in an in-plane direction of the panel face portion in the first and second stages is eliminated as possible or it should be controlled within a predetermined range in at least the second stage for annealing. With a result of this, a distribution of stress in an in-plane direction and in a cross-sectional direction in the panel face portion is in the permissible range.

Generally, temperature in an inner face of the panel face portion gradually increases from the central portion of the panel face portion which is in the lowest temperature region to the edge portion of the effective plane of the panel face portion, and corner portions in the inner face which are near the corners of a box-like panel have a highest temperature. Accordingly, the greatest temperature difference appears between the corner portions and the central portion of the inner face of the panel face portion. Therefore, the temperature difference can be reduced by concentratedly cooling the corner portions in a high temperature state. The corner portions indicate regions which are near the corners in the diagonal direction in the inner face of the rectangular panel face portion and which have a temperature higher than the other portion.

In the present invention, cooling operations are conducted to satisfy Formula 1 in a relation among a temperature $T_{2smax}$ at the corner portions in the inner face portion, which are in the highest temperature region at an initial step of the second stage, a temperature $T_{2smin}$ at the central portion in the inner face portion, which is in the lowest temperature region at an initial step of the second stage, a temperature $T_{2fmax}$ at the corner portions in the inner face portion at a final step of the second stage, and a temperature $T_{2fmin}$ at the central portion in the inner face portion at a final step of the second stage. In Formula 1, $T_{2smax}$ and $T_{2smin}$ are respectively deemed as the highest temperature at the corner portions in the inner face portion which is in the highest temperature region and the lowest temperature at the central portion in the inner face portion which is in the lowest temperature region. $T_{2fmax}$ and $T_{2fmin}$ can be treated similarly.

In a case of $(T_{2fmax}-T_{2fmin})/(T_{2smax}-T_{2smin})<0.4$, the temporary stress becomes excessively large to thereby invite the breakage of the glass panel. On the other hand, when $(T_{2fmax}-T_{2fmin})/(T_{2smax}-T_{2smin})>0.7$, it is difficult to obtain an effective physical strengthening effect. A particularly desirable range is 0.5–0.6.

Further, in the second stage, it is preferable to provide relations of annealing point$\leq T_{2smax}\leq 650°$ C., 400° C.$\leq T_{2smin}$, 350° C.$\leq T_{2fmin}$, and $T_{2fmax}$<strain point. In a case of annealing point>$T_{2smax}$, control to a strengthening stress necessary for the glass panel becomes impossible, and when $T_{2smax}$>650° C., glass sticks to the bottom mold so that the glass panel can not be taken out therefrom. Further, in a case of $T_{2smin}$<400° C., the glass panel is often broken just after it has been taken out. When $T_{2fmin}$<350° C., a resulted strengthened stress and the compaction become excessive. In order to maintain a stable strengthened stress, $T_{2fmax}$ should be less than the strain point.

In the present invention, the reduction of the temperature difference in the panel face portion can be controlled by adjusting a cooling rate to the corner portions in the inner face portion which are in the highest temperature regions and the central portion in the inner face portion which is lowest temperature region, in the second stage. Namely, when average cooling rates in these regions are represented respectively as $R_{2max}$ and $R_{2min}$, 45° C./min$\leq R_{2max}\leq 65°$ C./min and 30° C./min$\leq R_{2min}\leq 40°$ C./min are preferably used. When $R_{2max}$ is less than 45° C./min, an effective reduction of temperature difference can not be obtained. On the other hand, when it exceeds 65° C./min, breakage will occur. When $R_{2min}$ is less than 30° C./min, there is no effect for strengthening the glass panel for practical use. On the other hand, when it exceeds 40° C./min, an effective reduction of temperature difference can not be obtained.

Further, in the present invention, it is possible to improve a stress remaining finally in the panel face portion and uniformity of the compaction, or elimination of an undesirable uneven distribution of the compaction by suitably controlling the temperature of the glass panel, in the third stage. Namely, it is possible to reduce a temperature distribution wherein the temperature of the corner portions in the inner face portion is higher than that of the central portion in the inner face portion, by adjusting a temperature $T_{3smax}$ at the corner portions in the inner face portion, which are in the highest temperature region at an initial step of the third stage, a temperature $T_{3smin}$ at the central portion of the inner face portion, which is the lowest temperature region at an initial step of the third stage, a temperature $T_{3fmax}$ at the corner portions in the inner face portion at a final step of the third stage, and a temperature $T_{3fmin}$ at the central portion in the inner face portion at the final step of the third stage to provide relations of 350° C.$\leq T_{3smin}$, $T_{3smax}$<strain point, $T_{3smin}<T_{3smax}$ and $T_{3smin}<T_{3fmin}=T_{3fmax}$.

When $T_{3smin}$ is less than 350° C., the glass panel is apt to be broken. When $T_{3smax}$ is more than the strain point, a temperature difference between the corner portion and the central portion in the inner face portion becomes so excessive that it becomes difficult to control a distribution of strengthened stress.

Further, in order to conduct effectively the reduction of a temperature distribution in the panel face portion in a short time in the third stage, it is effective to change up-rates of temperature to the corner portions and the central portion in the inner face portion until temperatures at these portions become uniform. In more detail, the temperature of an annealing furnace should be determined so as to increase gradually or stepwisely from the inlet to the outlet of the furnace in the third stage.

The cooling rate is in proportion to a temperature difference between a temperature of the glass panel put in the furnace and a temperature of a cooling medium (a furnace temperature). Accordingly, it is so required that at the time just after the glass panel has been put in the furnace, a high cooling rate is given to the corner portion of the panel face by making a large difference between the glass temperature of the corner portion and the furnace atmosphere temperature, and on the other hand, the central portion of the panel face is heated up. With such temperature adjustment, the corner portions can be strengthened, and at the same time, a temperature distribution can be uniform in the panel face portion in a shorter time. Accordingly, the processing time for the third stage can be shortened, and at the same time, the strengthening stress can be improved. Experiments have revealed that when average up-rates of temperature for the corner portions and the central portion in the inner face portion of the panel face portion in the third stage are respectively determined to be $R_{3max}$ and $R_{3min}$, it is desirable that 2° C./min$\leq R_{3min}\leq 4°$ C./min and −1° C./min$\leq R_{3max}\leq 1°$ C./min.

In the second stage of the present invention, the simplest way to reduce a temperature difference between the central portion and the corner portions in the inner face portion of the panel face portion is to cool the corner portions in a high temperature state stronger than the other portion throughout or partly in the second stage. In the panel face portion of the glass panel before the second stage, the temperature of the inner face portion is generally higher than that of the outer face portion, and the temperature difference between the central portion and the corner portions in the inner face portion is greater than that of the outer face portion. Accordingly, it is effective to cool the corner portions in the inner face portion. Cooling air is generally used for the cooling operation. In this case, it is desirable to use a cooling rate wherein a temperature difference is produced between the inside and the surface in the wall thickness direction whereby a desired strengthening effect can be obtained.

In the second stage, the glass panel is taken out from the mold to be exposed to air so that the entirety of the glass panel is cooled. It is effective to conduct above-mentioned partial cooling in an earlier time in the second stage in which the glass panel is in a high temperature state as a whole, together with or in association with the exposure to air for cooling. In the second stage, pins may be attached to the skirt portion of the glass panel.

Now, the present invention will be described in detail with reference to Examples. However, it should be understood that the present invention is by no means restricted by such specific Examples.

As Examples of the present invention, 29-inch glass panels (glass code: 5001) manufactured by Asahi Glass Company Ltd. were used. Results are shown below along with Comparative Examples for the conventional method.

EXAMPLE 1

Figure 1:
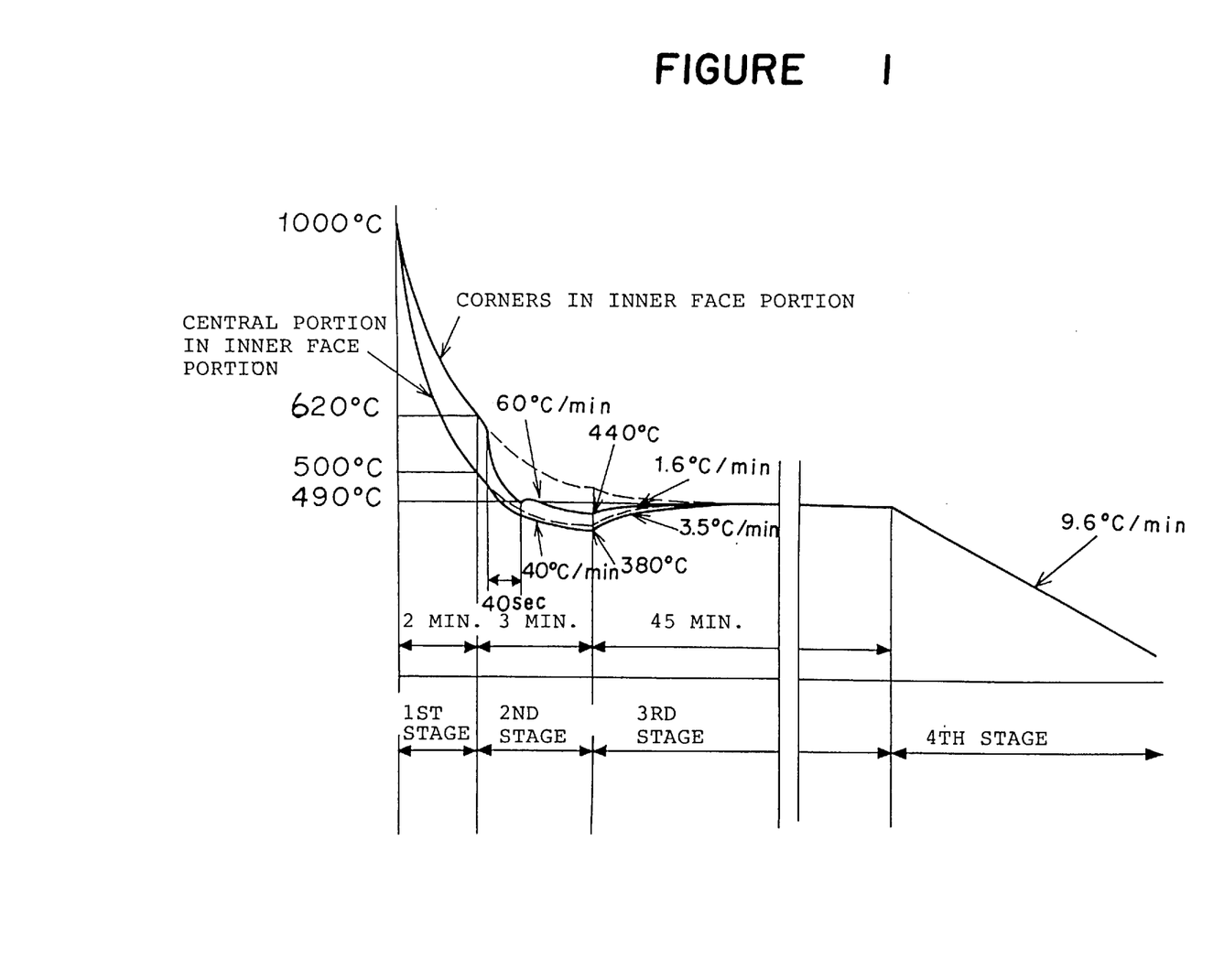
FIG. 1 is a graph showing a temperature change in a glass panel in a case that corner portions in the inner face portion are partially cooled rapidly in the second stage in an embodiment of the method for producing a glass panel according to the present invention.

About 27 sec after a panel was taken out from a mold in a second stage, corner portions in an inner face portion of the panel face were cooled by blasting an air stream for about 40 sec, each corner portion being at about 300 mm distance along a diagonal line from the center in the inner face portion of the panel face. FIG. 1 shows temperature changes of the central portion and the corner portions in the inner face portion of the glass panel throughout the first stage to the fourth stage.

EXAMPLE 2

Figure 2:
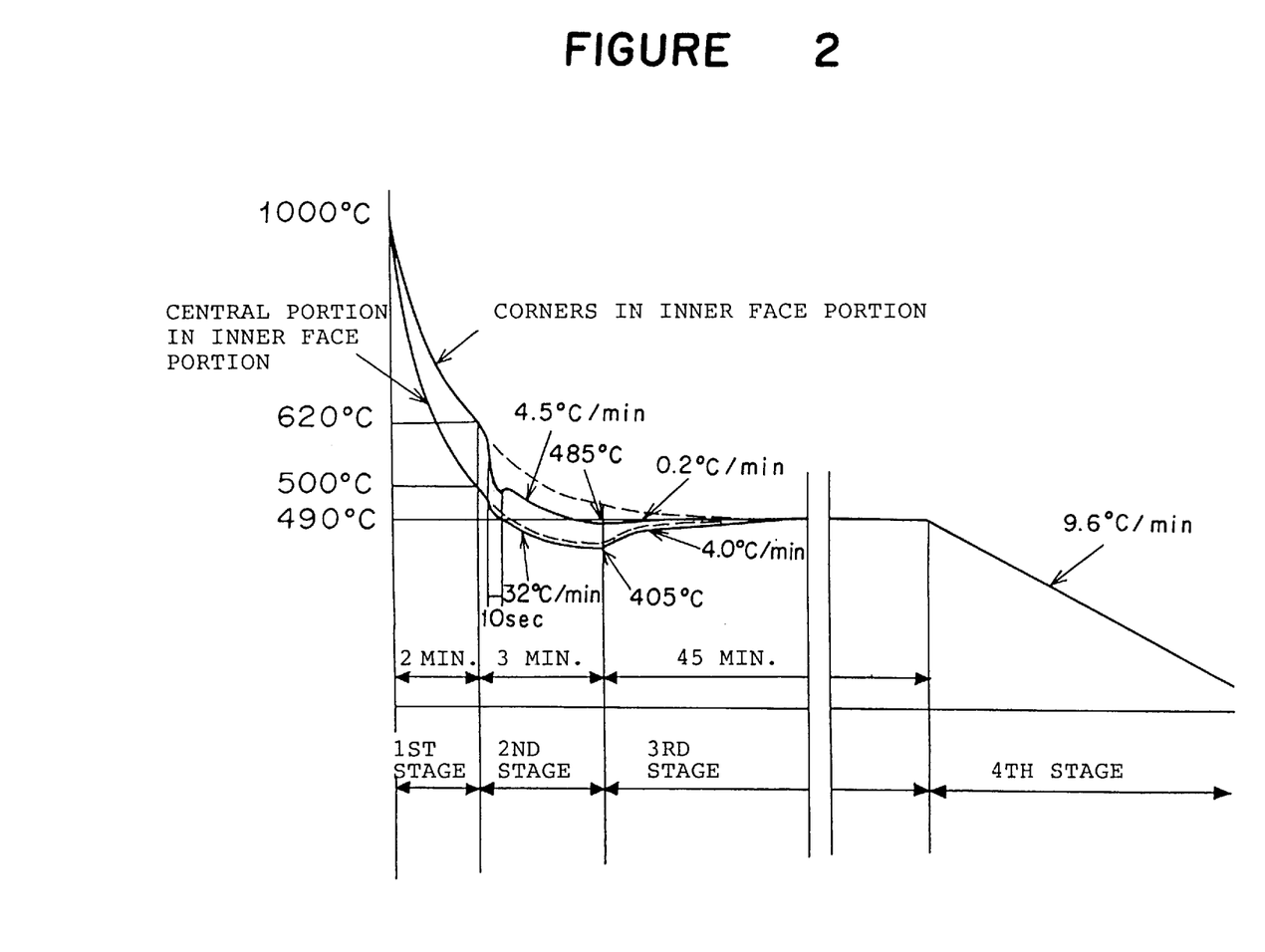
FIG. 2 is a graph showing a temperature change in the glass panel in a case that a time of rapidly cooling in the second stage is changed, in the embodiment of FIG. 1.

The same conditions as in Example 1 were employed except that the air stream was blasted for 10 sec. FIG. 2 shows the temperature changes in the panel face in this Example.

EXAMPLE 3

Figure 3:
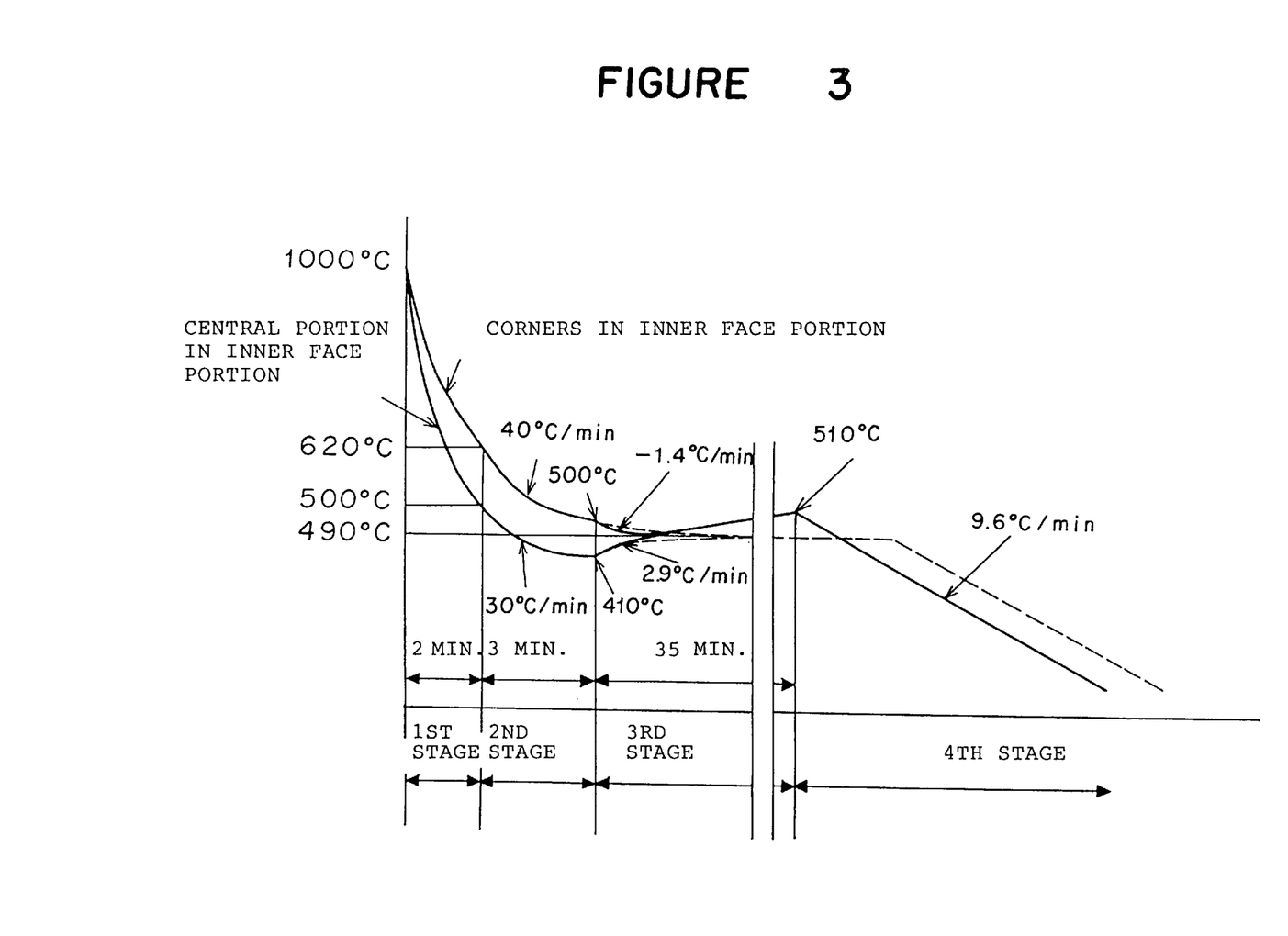
FIG. 3 is a graph showing a temperature change in a glass panel in a case that a temperature in an annealing furnace is raised at a constant up-rate of temperature in the third stage in another embodiment of the present invention.

The temperature of the panel face wherein an initial temperature distribution in the inner face portion before the third stage was $T_{3smax}=500°$ C. and $T_{3smin}=410°$ C. was gradually increased to 510° C. for 35 min to equalize the temperature distribution. FIG. 3 shows temperature changes in the panel face wherein a dotted line shows a temperature change in the conventional method for reference. As understood from FIG. 3, the temperature difference between the central portion and the corner portions in the inner face portion can be reduced in a short time, and a time required for the third stage can be shortened in comparison with the conventional method.

EXAMPLE 4

In Example 3, a time for the third stage was determined to be 45 min and a time for relaxing in an uniform temperature state was made longer than that in Example 3.

EXAMPLE 5 (Comparative Example)

Figure 4:
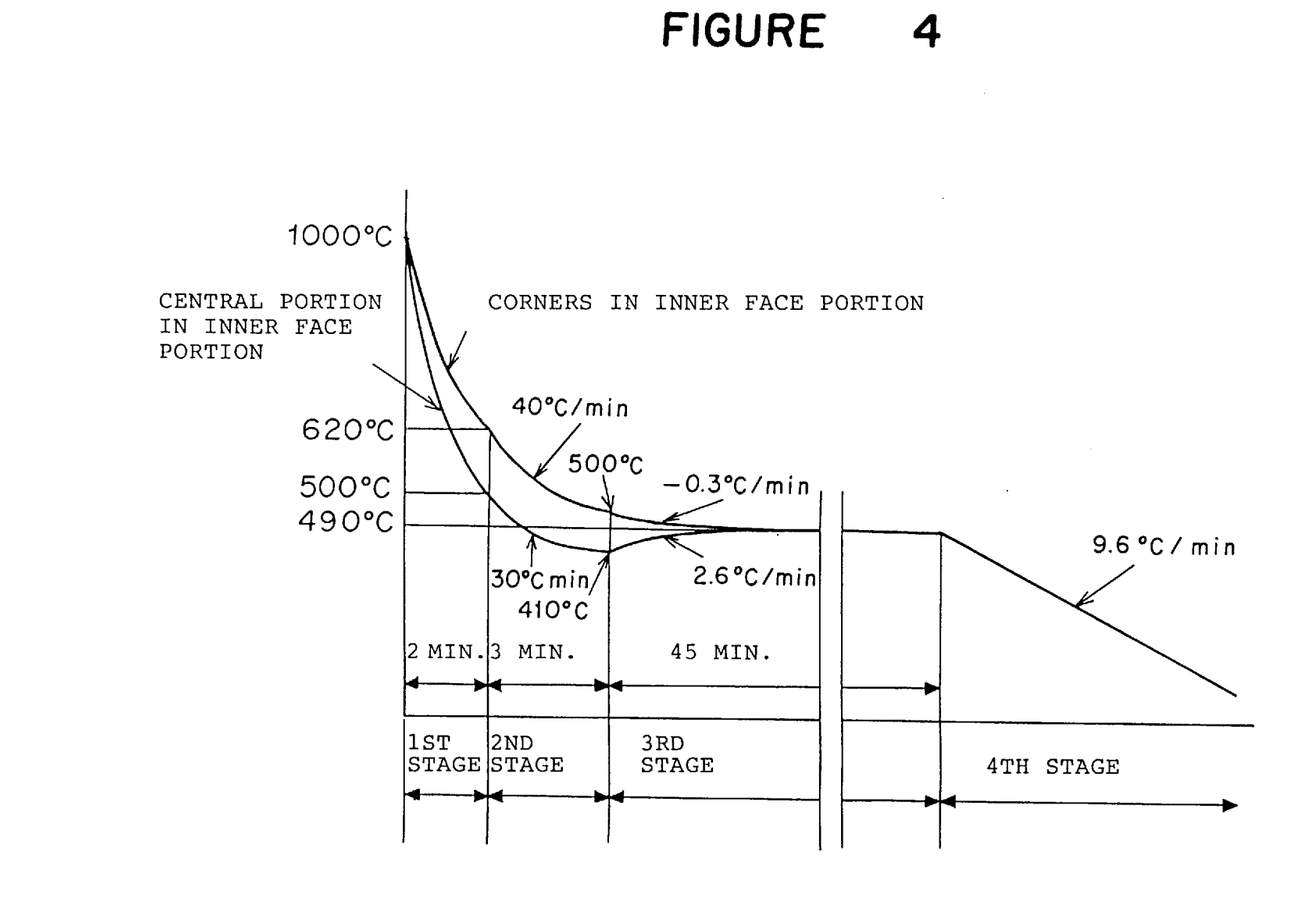
FIG. 4 is a graph showing a temperature change of the glass panel in a case that a time for the third stage is elongated in the embodiment of FIG. 3.

FIG. 4 shows temperature changes in a panel face by the conventional method.

Table 1 to Table 4 describe temperatures and average cooling rates at an initial step and a final step in the second stage and the third stage, a strengthened stress of the panel face after annealing, the maximum plane stress, and the magnitude of mislanding for each of the Examples.

TABLE 1

| Condition | a $T_{2smax}$ °C. | b $T_{2smin}$ °C. | c $T_{2fmax}$ °C. | d $T_{2fmin}$ °C. | $R_{2max}$ °C./min | $R_{2min}$ °C./min | c − d/ a − b |
|---|---|---|---|---|---|---|---|
| Example 1 Partial cooling 40 sec, 490° C. maintained | 620 | 500 | 440 | 380 | 60 | 40 | 0.50 |
| Example 2 Partial cooling 10 sec, 490° C. maintained | 620 | 500 | 485 | 405 | 45 | 32 | 0.67 |
| Example 5 490 maintained | 620 | 500 | 500 | 410 | 40 | 30 | 0.75 |

TABLE 2

| | Strengthened stress (MPa) | | | Magnitude of |
|---|---|---|---|---|
| Condition | Center | Corner | Ratio | mislanding |
| Example 1 Partial cooling 40 sec. 490° C. maintained | −21.7 | −20.7 | 0.95 | 18.5 μm |
| Example 2 Partial cooling 10 sec 490° C. | −20.7 | −14.0 | 0.68 | 23.1 μm |

TABLE 2-continued

| Condition | Strengthened stress (MPa) | | | Magnitude of mislanding |
| --- | --- | --- | --- | --- |
| | Center | Corner | Ratio | |
| maintained | | | | |
| Example 5  490 maintained | −15.6 | −9.1 | 0.58 | 26.4 μm |

TABLE 3

| Condition | $T_{3smax}$ °C. | $T_{3smin}$ °C. | $T_{3fmax}$ °C. | $T_{3fmin}$ °C. | $R_{3max}$ °C./min | $R_{3min}$ °C./min | Maximum plane stress (MPa) |
| --- | --- | --- | --- | --- | --- | --- | --- |
| Example 3  Gradually increasing furnace temperature 450° C.→510° C. | 500 | 410 | 470 | 470 | −1.4 | 2.9 | 1.2 |
| Example 4  Gradually increasing furnace temperature 450° C.→510° C. | 500 | 410 | 460 | 460 | −1.9 | 2.4 | 0.5 |
| Example 5  490 maintained | 500 | 410 | 480 | 480 | −0.3 | 2.6 | 1.6 |

TABLE 4

| Condition | Strengthened stress (MPa) | | | Magnitude of mislanding |
| --- | --- | --- | --- | --- |
| | Center | Corner | Ratio | |
| Example 3  Gradually increasing furnace temperature 450° C.→510° C. | −16.2 | −9.9 | 0.61 | 24.2 μm |
| Example 4  Gradually increasing furnace temperature 450° C.→510° C. | −13.1 | −8.5 | 0.65 | 23.5 μm |
| Example 5  490 maintained | −15.6 | −9.1 | 0.58 | 26.4 μm |

Figure 5:
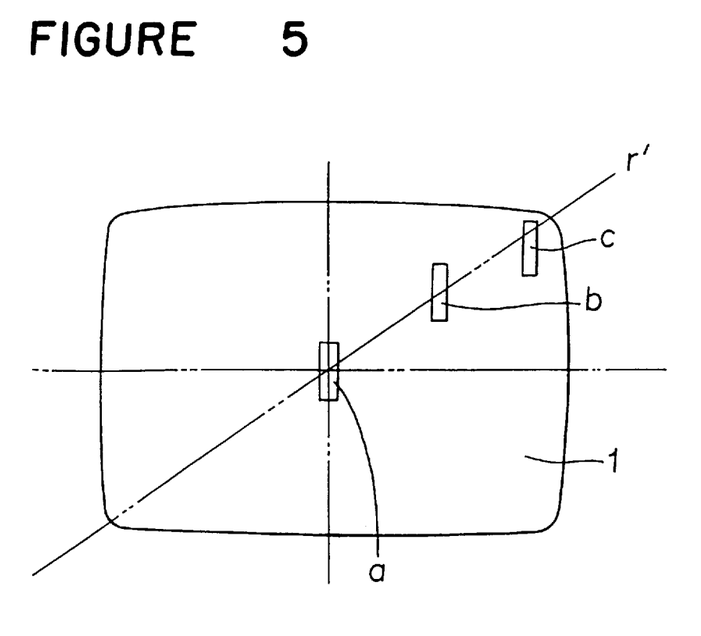
FIG. 5 is a diagram for explaining a method of calculating the magnitude of mislanding at an edge portion of the effective plane area of the panel face portion.
Figure 6:
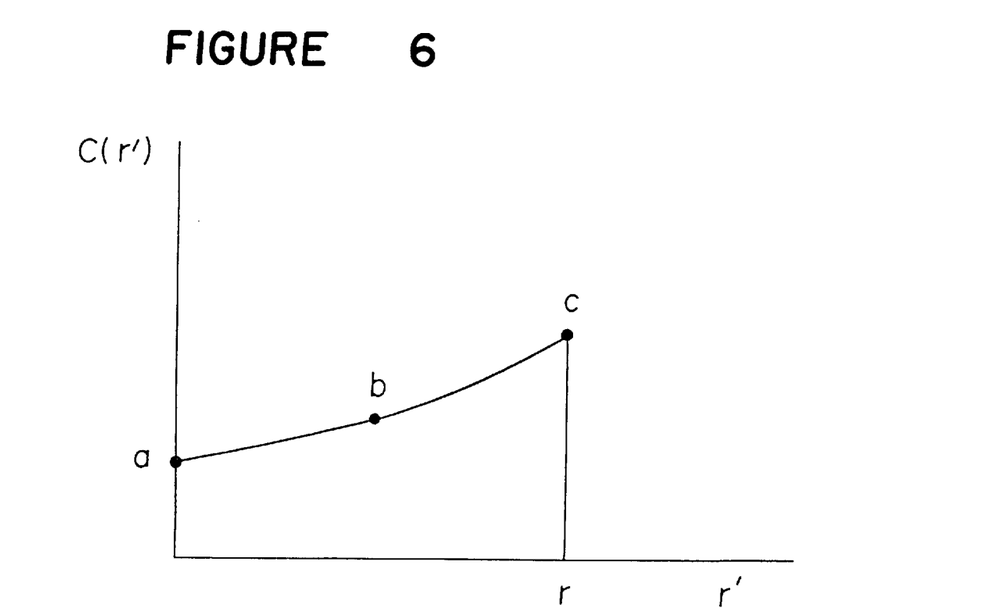
FIG. 6 is a graph for explaining a method of calculating the magnitude of mislanding at an edge portion of the effective plane area of the panel face portion.

Magnitude of mislanding at an edge portion in the effective plane of the panel face which is at an edge along a diagonal axis in the panel face, was calculated by the following method. In FIG. 5, test pieces (150 mm×2 mm) for measuring the compaction were cut off from regions of the central portion a, a corner portion c and an intermediate portion b on a diagonal line r' in the panel face portion 1. These test pieces were heated at about 440° C. in consideration of the actual heat treatment for producing CRT. Then, compaction C(r') was measured for each of the regions. Values obtained by measuring the compaction of these three regions were plotted as shown in FIG. 6, and the magnitude of mislanding was calculated by using Formula 2 in approximation of a parabolic line.

For the compressive stress value in the strengthened surface layer, the panel face was cut off to have a thickness of about 15 mm, and the compressive stress value was measured by using a photoelastic stress gauge according to a direct method (Sénarmont method) ruled in JIS-S2305.

The plane stress was measured as follows. A strain gauge was attached to a portion of the glass panel, the stress of the portion being to be evaluated. The skirt portion is cut off from the glass panel. A portion in the vicinity of the measuring point was cut away to have a size of about 10 cm×10 cm. Then, a change of strain quantity before and after the cutting was measured.

As understood from Tables 1 to 4, a difference of strengthened stress between the central portion and the corner portions in the inner face portion of the panel face in Examples 1 and 2 (the present invention) is smaller than that of Example 5 (Comparative Example), and it is understood that the glass panel is uniformly strengthened. Further, the degree of strengthening is larger than the conventional Example in any regions of the central portion and the corner portions of the panel face, which indicates that a strong glass panel is obtainable. In particular, in Example 1 wherein the corner portions in the inner face portion are partially cooled for a longer time in the second stage, the degree of strengthening is larger than that of Example 2 wherein a cooling time is shorter, and at the same time, a difference of stress between the central portion and the corner portions is small whereby the panel face portion is further uniformly strengthened as a whole. As the result of uniformly strengthening, the magnitude of mislanding is smaller than that of Comparative Example.

On the other hand, in Example 3 and Example 4, uniformity in strengthening stress and the degree of strengthening in the central portion and the corner portions of the panel face as well as the magnitude of mislanding are inferior to those of Examples 1 and 2. However, these values are superior to those of Comparative Example. The maximum tensile plane stress, which is unnecessary, produced in the edge portion in or near the effective plane of the panel face can be reduced in comparison with Comparative Example, and a glass panel having less uneven plane stress can be obtained. This tendency is remarkable in Example 4 wherein a time for the third stage is equal to Comparative Example.

In the present invention, a ratio of a compressive strengthened stress value produced in or near the edge portion in the effective plane in the inner face portion of the panel face to a strengthened stress value in the central portion of the inner face portion of the panel face can be increased. Namely, the panel face portion can uniformly be strengthened by increasing a degree of strengthening in the corner portions in the inner face portion which have been difficult in obtaining strengthening. Further, the magnitude of mislanding which appears remarkably in the edge portion of the effective plane can be reduced by the uniformly strengthening.

Further, it is possible to shorten a time for the third stage, and an unnecessary tensile plane stress produced in or near the edge portion of the effective plane of the panel face can be reduced.

What is claimed is:

1. A method for producing a glass panel for a cathode ray tube which comprises:
   a first stage of press-forming molten glass put in a mold and solidifying the formed glass until a glass surface temperature reaches lower than a sticking temperature; said formed glass having an inner and outer face portions, both said inner and outer face portions having a central portion, a second stage of cooling for strengthening the formed glass after it has been taken out from the mold, a third stage of relaxing a temporary stress in the formed glass which is produced during the second stage, and a fourth stage of cooling the formed glass to room temperature to produce a sufficient permanent stress, wherein corner portions in said inner face portion of the formed glass, which are in the highest temperature region in the second stage, are cooled more quickly than the central portion of the inner face portion to reduce a temperature gradient to the central portion of the inner face portion which is in the lowest temperature region.

2. The method for producing a glass panel according to claim 1, wherein the formed glass is cooled so as to satisfy the following Formula 1:

$$0.4 \leq (T_{2fmax} - T_{2fmin})/(T_{2smax} - T_{2smin}) \leq 0.7 \qquad \text{Formula 1}$$

where $T_{2smax}$ is a temperature at the corner portions in the inner face portion, which are in the highest temperature region at an initial step of the second stage, $T_{2smin}$ is a temperature at the central portion in the inner face portion, which is in the lowest temperature region at an initial step of the second stage, $T_{2fmax}$ is a temperature at the corner portions in the inner face portion at a final step of the second stage, and $T_{2fmin}$ is a temperature at the central portion in the inner face portion at a final step of the second stage.

3. A method for producing a glass panel according to claim 2, wherein in the second stage, $T_{2smax}$, $T_{2smin}$, $T_{2fmax}$ and $T_{2fmin}$ are respectively in ranges of annealing point $\leq T_{2smax} \leq 650°$ C., 400° C. $\leq T_{2smin}$, 350° C. $\leq T_{2fmin}$, and $T_{2fmax} \leq$ strain point.

4. A method for producing a glass panel according to claim 2, wherein in the second stage, an average down-rate temperature $R_{2max}$ at the corner portions in the inner face portion and an average down-rate of temperature $R_{2min}$ at the central portion in the inner face portion are respectively in ranges of 45° C./min $\leq R_{2max} \leq 65°$ C./min and 30° C./min $\leq R_{2min} \leq 40°$ C./min.

5. A method for producing a glass panel according to claim 2, wherein temperature is controlled to satisfy the relations of 350° C. $\leq T_{3smin}$, $T_{3smax} <$ strain point, $T_{3smin} < T_{3smax}$, and $T_{3smin} < T_{3fmin} = T_{3fmax}$, where $T_{3smax}$ is a temperature at the corner portions in the inner face portion, which are in the highest temperature region at an initial step of the third stage, $T_{3smin}$ is a temperature at the central portion in the inner face portion, which is in the lowest temperature region at an initial step of the third stage, $T_{3fmax}$ is a temperature at the corner portions in the inner face portion at a final step of the third stage, and $T_{3fmin}$ is a temperature at the central portion in the inner face portion at a final step of the third stage.

6. A method for producing a glass panel according to claim 5, wherein in the third stage, an average up-rate temperature $R_{3max}$ at the corner portions in the inner face portion and an average down-rate of temperature $R_{3min}$ at the central portion in the inner face portion are respectively in ranges of 2° C./min $\leq R_{3min} \leq 4°$ C./min and $-1°$ C./min $\leq R_{3max} \leq 1°$ C./min.

* * * * *